F. S. CARVER.
PRESS.
APPLICATION FILED JULY 9, 1917.
1,247,078.
Patented Nov. 20, 1917.
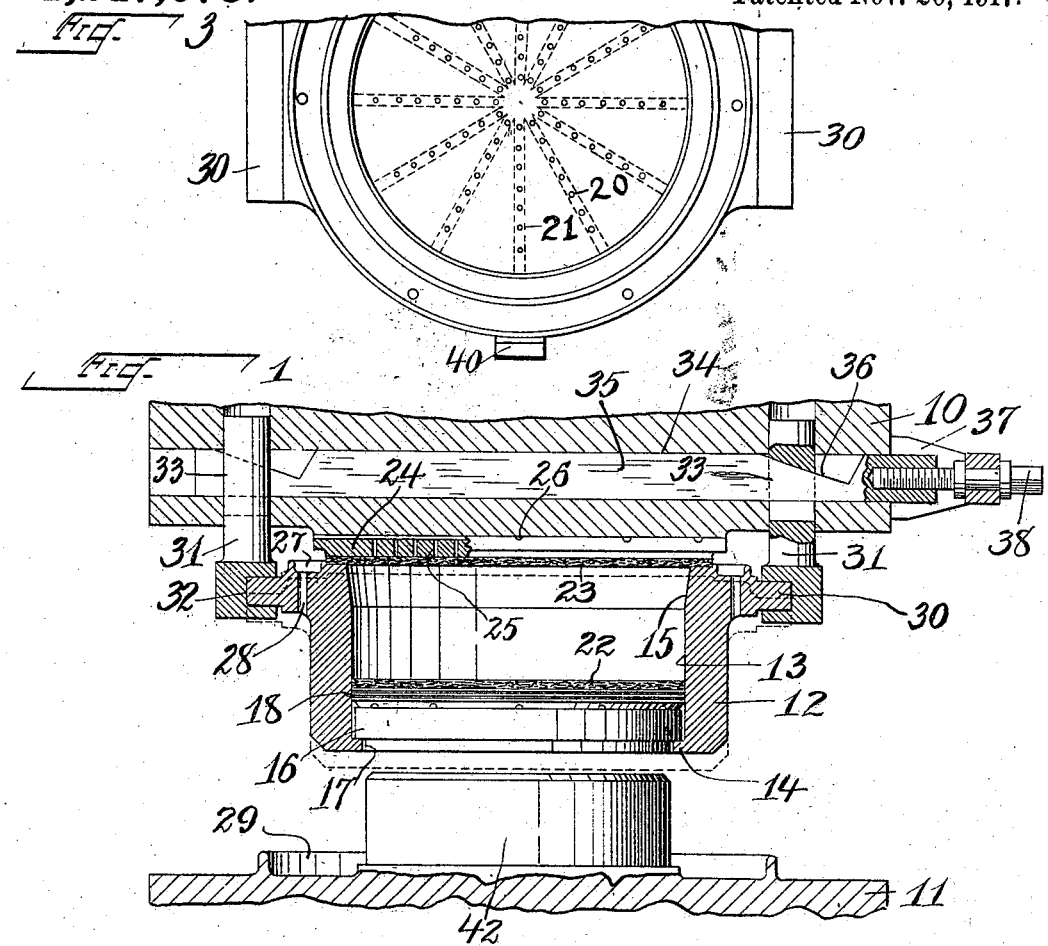
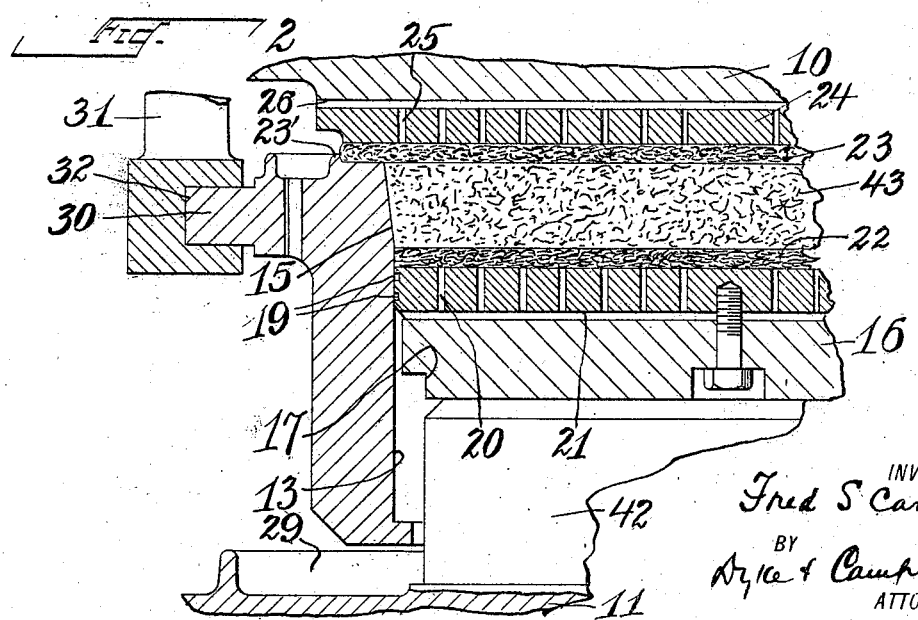
INVENTOR
Fred S Carver
BY
Dyke & Campbell
ATTORNEYS

UNITED STATES PATENT OFFICE.

FRED S. CARVER, OF EAST ORANGE, NEW JERSEY.

PRESS.

1,247,078.

Specification of Letters Patent.

Patented Nov. 20, 1917.

Application filed July 9, 1917. Serial No. 179,341.

*To all whom it may concern:*

Be it known that I, FRED S. CARVER, a citizen of the United States, and a resident of East Orange, county of Essex, and State of New Jersey, have invented certain new and useful Improvements in Presses, of which the following is a specification.

This invention relates to presses, and more particularly to presses for extracting fluids from substantially semi-fluid material, as, for example, for extracting the fluid from ground cocoa beans in the manufacture of chocolate and similar preparations.

The object of the invention is the improvement of devices of this character in important respects as will hereinafter be pointed out, and with these and related objects in view the invention consists of the parts, improvements and combinations herein set forth and claimed.

In the drawings forming part of this specification an embodiment of the invention is illustrated, but it is to be understood that such drawings are for the purpose of affording a clear disclosure of the invention only, and that I am not to be limited thereto, except as required by my claims.

In said drawings, in which the same reference numerals designate the same parts throughout, Figure 1 is a central vertical sectional view of a fragment of a press equipped with my improvements. Fig. 2 is an enlarged fragmentary sectional view taken in the same way as Fig. 1 and showing the parts in a different position, and Fig. 3 is a plan view of the pot or cylinder in which the material is received.

Reference numerals 10 and 11 designate the press elements, of which the former, 10, may be stationary and the latter, 11, may be thrust upward under great pressure, preferably hydraulic pressure, or the member 11 may be stationary and the member 10 movable.

In presses for extracting the liquid extract from ground cocoa beans the operation of extracting the liquid is usually carried out in presses adapted to receive a number of the pots or cylinders, but the operation on each such pot or cylinder is identical and for the purposes of the present invention it is sufficient to illustrate a single one of these. Such pot or cylinder is designated by reference numeral 12 and it has a principal bore 13 in its lower portion which is preferably a substantially true cylinder. A lower shoulder 14 is provided and an upper tapered portion of the bore 15 is provided which will be referred to more at length hereinafter. The pot 12 receives a piston or follower 16 which preferably is chamfered as shown at 17 and rests upon the shoulder 14 and is provided with an upwardly extending part 18 fitting substantially closely within the cylindrical bore 13 and preferably provided with circumferential grooves 19 which serve, when the fluid is being expressed under pressure, as packing grooves. The piston 16 is provided with orifices and conducting bores for conducting away the liquid to be expressed, and in the form shown is provided with a plurality of vertical drill holes 20 communicating with radial channels 21, and these channels in turn communicate with the space between the piston 16 and the bore 13 so that any fluid expressed passing through the holes 20 and channels 21 is discharged and passes out through the bottom of the pot 12. Upon the top of the piston 16 is placed a layer 22 of porous material such as felt. The cocoa liquor or other substantially semi-fluid material from which the fluid extract is to be expressed is then placed within the pot 12 filling it to substantially its top and thereon is placed a pad 23 similar to the pad 22 and of felt or like material which is received within an annular depression provided by forming a rib 23' about the upper outer edge of the pot 12. The pressure plate 24 is secured to the press member 10 and is provided with vertical drill holes 25 and preferably radial channels 26 which, like the openings 20 and 21, serve to conduct the expressed fluid out to the edges of the plate 24, whence it flows down into the trough 27 in the upper surface of the pot and through the holes 28 and falls with the fluid from the lower portion of the pot into the trough 29 in the press member 10 from which it is collected as by being drawn off into a receptacle.

Means are provided for preliminarily securing the pot and its contents covered by the pad 23 in place in the press and holding them in the proper relation thereto. In the form shown the pots are provided with laterally extending lugs 30, 30 preferably of considerable length as shown in Fig. 3, and the press member 10 is provided with holding members 31, 31 having grooves 32, 32 therein in which the lugs 30, 30 are received and the holding members 31, 31 are provided with slots 33, 33 preferably beveled on their upper sides as indicated in Fig. 1, and preferably passing through the press member 10, and in line with said slots is a slot or aperture 34 in which is received a slide bar 35 having beveled portions 36, 36 citizen of the United States, residing in the be passed through the slots 33 in the members 31, and means for moving said lock bar 35 lengthwise to clamp the holding members 31 in place are provided; in the form shown there being a yoke 37 and a bolt 38 screw-threaded into the end of the lock bar 35.

When the filled pots are to be inserted in place in the press the members 31, 31 are preferably lowered by permitting the clamping bar 35 to be moved to the left and the filled pots may then be put in place therein, the lugs 30 being slid into the grooves in the members 31 until means provided for that purpose prevents such further sliding movement, as by contacting with a portion of the press. In the form shown the pot 12 is provided with an upstanding lug 40 to serve as a stop, stopping the movement of the pot so that it registers centrally under the plate 24. The pot 12 being thus located in proper position is clamped to the press member 10 by screwing up on the screw 38, thereby drawing the clamp bar 35 outward, thus elevating the members 31 and the pot 12 and clamping the pot 12 firmly against the lower surface of the pressure plate 24 and thereby elevating the pot and its contents from substantially the dotted line position shown in Fig. 1 to the full line position shown in said figure and confining the filter pad 23 between the top of the pot and the pressure plate 24.

The press member 11 is provided with a presser-head 42 preferably having an upper surface of substantially the same size and shape as the bottom of the piston 16 or slightly smaller and serving, when the press member 11 is elevated, to exert upward pressure on the piston 16. By such pressure, preferably hydraulic pressure, the piston 16 may be elevated to the position shown in Fig. 2 in which position substantially all the fluid extract has passed through the filter pads 22 and 23 and out through the channels provided for that purpose and then collected from the trough 29 in which it accumulates, and a cake 43 of the solid matter which cannot pass through the filter pads remains between the filter pads and is compressed into a very hard and solid mass.

In devices for this purpose as heretofore constructed the pots have had a bore tapering substantially uniformly from the smallest diameter at the bottom to the largest diameter at the top, the taper being the same and continuous throughout the height of the pot. This has been done in order that it may be possible to remove the hard cake formed in the press after the liquor has been extracted, and with such devices it has been necessary, in order to prevent the liquor from escaping past the piston, to provide special cup packings of felt or the like for the piston which, following the enlarging taper of the bore, expand somewhat as the piston travels upward and become clogged with the solid material, and it becomes very difficult, by reason of such clogged condition of the pistons and cup packing, to return the same to their initial positions at the bottom of the pots, as is necessary for subsequent operations with the new batches of material from which the liquid is to be expressed. It has been the practice to pound the pistons downward, in the old pots having bores of uniform taper and cup packings, with lead hammers and the like and the rough treatment to which these parts must be subjected frequently results in breakage and in scratching the bore of the pots and otherwise results in the necessity for frequent renewals and cleanings and repairing of the parts of this apparatus.

There is a substantially definite ratio, in the case of material, such as ground cocoa beans, between the quantity of material initially treated and the material of the resulting mass or cake remaining after the expressing has been completed. For example, for a pot containing ground cocoa liquor four inches in depth, the resulting cake is practically one and a half inches in thickness. I have found that by making the wall 13 of the pot 12 cylindrical and making no provision for packing the piston 16 except the grooves 19, and by confining all the taper of the bore of the pot to the upper portion 15 thereof, it becomes possible, by reason of the considerable degree of taper which may be given in this neighborhood, to readily remove the cake which is formed, and which is substantially cylindrical during all the processes of its formation until at or about the completion thereof and is therefore not as greatly solidified at its edges as throughout the principal portion of its mass, from the enlarged bore portion 15 of the pot with substantial ease, and that the piston does not clog and it is possible to return the piston 16 to its position at the bottom of the pot without the exercise of any considerable force and without any particular difficulty, the piston sliding smoothly down the cylindrical wall of the bore 13 at the lower portion of the pot. With my construction a certain amount of the solid matter from the ground cocoa bean liquor, or other substantially semi-fluid material being pressed, lodges in the grooves 19 which practically forms a packing; this, together with the close fit of the piston top 18, prevents the liquor from escaping. This close fit is maintained at all times because the piston travels through a bore of constant diameter, and for the same reason the piston cannot easily stick or bind in coming down. It is evident that with the taper extending throughout the full depth of the pot this simple arrangement for packing could not be used. With devices constructed in accordance with the invention it becomes readily possible to secure vastly better results than have heretofore been obtained, and the device can be used over long periods of time without injury and without the necessity of resorting to the harsh treatment which heretofore has been necessary.

The operation of the apparatus has been fully set forth in connection with its description. It will be understood that changes and modifications in the construction illustrated may be resorted to within the scope of my claims without departing from or sacrificing the advantages of my invention.

Having thus described my invention, I claim:

1. A press cylinder for extracting liquid from liquid containing substantially semi-solid materials having a uniform straight bore throughout a part of its height and the rest of the bore being tapered.

2. The combination of a press cylinder for extracting liquid from liquid containing materials having a uniform straight bore portion and a tapered bore portion, and a piston adapted to traverse the straight bore portion.

3. The combination of a press cylinder for extracting liquid from liquid containing solid materials having the lower part of its bore straight and the upper part of larger diameter than the first named bore portion, and a piston adapted to traverse the first named bore portion.

4. The combination of a press cylinder for extracting liquid from liquid containing materials having a uniform straight bore lower portion and an upper portion provided with a tapered bore of larger diameter, a piston for traversing the straight bore portion, and means for clamping said press cylinder to a press.

5. The combination of a press cylinder for extracting liquid from liquid containing materials having a straight bore portion, and a piston adapted to traverse said straight bore portion and a tapered bore portion joining the straight bore portion and of larger diameter and from which the cake of solid material, remaining after liquid has been expressed, may be easily removed.

6. The combination of a press cylinder for expressing fluid from liquid containing solid materials having a straight bore portion and a tapered bore portion of substantially one-third the height of the straight bore portion.

7. In a press, an upper press member, clamping means thereon, a cylinder for containing material from which the fluid is to be expressed, said cylinder being adapted to be clamped to said press member by said clamping means said cylinder having a straight lower bore portion and an upper tapered bore portion, a piston in the straight bore portion, a second press member, and a press head adapted to press said piston upwardly within said cylinder.

8. The combination of a press cylinder for extracting liquid from liquid containing materials having a straight bore portion, and a piston adapted to traverse said bore portion, said piston being provided with a packing groove, and said cylinder having a bore portion joining the first named bore portion and of larger diameter and from which the cake of solid material, remaining after liquid has been expressed, may be easily removed.

9. The combination of a press cylinder for extracting liquid from liquid containing materials having a uniform straight bore lower portion and an upper portion provided with a tapered bore of larger diameter, a piston for traversing the straight bore portion and being provided with a plurality of packing grooves, and means for clamping said press cylinder to a press.

10. A press cylinder for extracting liquid from liquid containing solid materials having a uniform straight bore throughout a part of its height and adapted to be traversed by a piston, and the rest of the bore being of larger diameter.

In testimony that I claim the foregoing, I hereto set my hand, this 5th day of July, 1917.

FRED S. CARVER.